US006882983B2

(12) United States Patent
Furphy et al.

(10) Patent No.: US 6,882,983 B2
(45) Date of Patent: Apr. 19, 2005

(54) METHOD AND SYSTEM FOR PROCESSING TRANSACTIONS

(75) Inventors: Thomas W. Furphy, Pittsford, NY (US); David W. Bandych, Penfield, NY (US); John T. Marron, Rochester, NY (US); Jason A. Carreira, Rochester, NY (US)

(73) Assignee: Notiva Corporation, Rochester, NY (US)

( * ) Notice: Subject to any disclaimer, the term of this patent is extended or adjusted under 35 U.S.C. 154(b) by 421 days.

(21) Appl. No.: 09/777,168

(22) Filed: Feb. 5, 2001

(65) Prior Publication Data

US 2002/0107794 A1 Aug. 8, 2002

(51) Int. Cl.[7] ............................................... G06F 17/60
(52) U.S. Cl. ......................................... 705/30; 705/34
(58) Field of Search ..................................... 705/30, 34

(56) References Cited

U.S. PATENT DOCUMENTS

| | | | | |
|---|---|---|---|---|
| 4,491,725 A | * | 1/1985 | Pritchard | 705/2 |
| 4,972,318 A | * | 11/1990 | Brown et al. | 705/26 |
| 5,159,667 A | * | 10/1992 | Borrey et al. | 715/500 |
| 5,568,627 A | * | 10/1996 | Leshay et al. | 711/112 |
| 5,717,989 A | | 2/1998 | Tozzoli et al. | |
| 5,832,460 A | | 11/1998 | Bednar et al. | |
| 5,903,878 A | * | 5/1999 | Talati et al. | 705/26 |
| 5,970,475 A | * | 10/1999 | Barnes et al. | 705/27 |
| 5,991,750 A | * | 11/1999 | Watson | 705/44 |
| 6,006,199 A | * | 12/1999 | Berlin et al. | 705/26 |
| 6,009,414 A | * | 12/1999 | Hoshiya et al. | 705/30 |
| 6,044,362 A | | 3/2000 | Neely | |
| 6,058,380 A | | 5/2000 | Anderson et al. | |
| 6,097,834 A | | 8/2000 | Krouse et al. | |
| 6,209,111 B1 | * | 3/2001 | Kadyk et al. | 714/747 |
| 6,317,737 B1 | * | 11/2001 | Gorelik et al. | 707/3 |
| 6,341,265 B1 | * | 1/2002 | Provost et al. | 705/4 |
| 6,343,275 B1 | * | 1/2002 | Wong | 705/26 |
| 6,360,211 B1 | * | 3/2002 | Anderson et al. | 705/40 |
| 6,385,595 B1 | * | 5/2002 | Kolling et al. | 705/40 |
| 6,470,490 B1 | * | 10/2002 | Hansen | 717/106 |
| 6,487,285 B1 | * | 11/2002 | Gilles et al. | 379/207.13 |
| 6,507,813 B1 | * | 1/2003 | Veditz et al. | 704/8 |
| 6,507,826 B1 | * | 1/2003 | Maners | 705/34 |
| 6,554,183 B1 | * | 4/2003 | Sticha et al. | 235/379 |
| 6,560,608 B1 | * | 5/2003 | Tomm et al. | 707/102 |
| 6,601,057 B1 | * | 7/2003 | Underwood et al. | 707/1 |
| 2002/0052812 A1 | * | 5/2002 | Braverman | 705/34 |
| 2002/0082990 A1 | * | 6/2002 | Jones | 705/40 |

FOREIGN PATENT DOCUMENTS

WO    WO 97/29445    * 8/1997    .................. 705/30

OTHER PUBLICATIONS

"Office Products firms begin test of Computerized Orders", Sales and Marketing Management, vol. 134, No. 7 p 113, May 1985.*

* cited by examiner

*Primary Examiner*—Joseph A. Fischetti
(74) *Attorney, Agent, or Firm*—Heller Ehrman White & McAuliffe LLP (57) ABSTRACT

The present invention discloses a system and method for processing business transactions between trading partners using a central interactive platform. The processing may include comparing purchase order data and invoice data to identify matching information and non-matching information. If the information matches, the invoices are processed for payment. If the information does not match, the discrepancies are identified to the buying company or the selling company for resolution.

29 Claims, 9 Drawing Sheets

METHOD AND SYSTEM FOR PROCESSING TRANSACTIONS

COPYRIGHT NOTICE

Contained herein is material that is subject to copyright protection. The copyright owner has no objection to the facsimile reproduction of the patent disclosure by any person as it appears in the Patent and Trademark Office patent files or records, and otherwise reserves all rights to the copyright.

BACKGROUND OF THE INVENTION

The present invention relates to processing business transactions, and, more particularly, to a method and system for providing a single transaction point to process business transactions between multiple trading partners.

When one company, a purchaser, desires to buy products from another company, a supplier, an order is traditionally transmitted by the buying company to the selling company via a purchase order. The purchase order may be for a single product or for more than one product. If more than one product has been ordered, generally the purchase order will have a line item entry for each separate product. Often, a particular individual associated with the buying company, typically designated a "buyer," is responsible for each particular purchase order. A company may have one or more such buyers.

The selling company then fills the order and sends the product(s) to the buying company. The buying company generally notes the quantity of product received on the purchase order, creating a receipt document. After the selling company has shipped the product(s) to the buying company, the selling company generates and sends to the buying company an invoice for payment for the product(s). Usually, the invoice will have line item entries corresponding to those line item entries on the purchase order and receipt document. Sometimes the invoice will have line item entries corresponding to the line items on more than one purchase order or receipt document. This invoice corresponds to a receivable asset of the selling company associated with the amount due from the buying company.

The selling companies may also sell the receivable associated with the invoice to a third party, such as a bank or other receivables factoring party, based on a discount from the receivable amount. This allows the selling company to receive the cash before the invoice is paid to better manage the cash flow. This also shifts the risk to the third party that the buying company will timely pay the invoice and will have no disputes with the invoice information. This is known as factoring.

The current infrastructure in both traditional and internet business-to-business transactions is highly fragmented with buying companies and selling companies each dealing with hundreds or thousands of parties, purchase orders, invoices, and receipt documents. A selling company's billing data is a component of a buying company's accounts payable data. A buying company's remittance data is a component of a selling company's accounts receivable data. Further, a company may be a buying company for some products and a selling company for other products.

Figure 1:
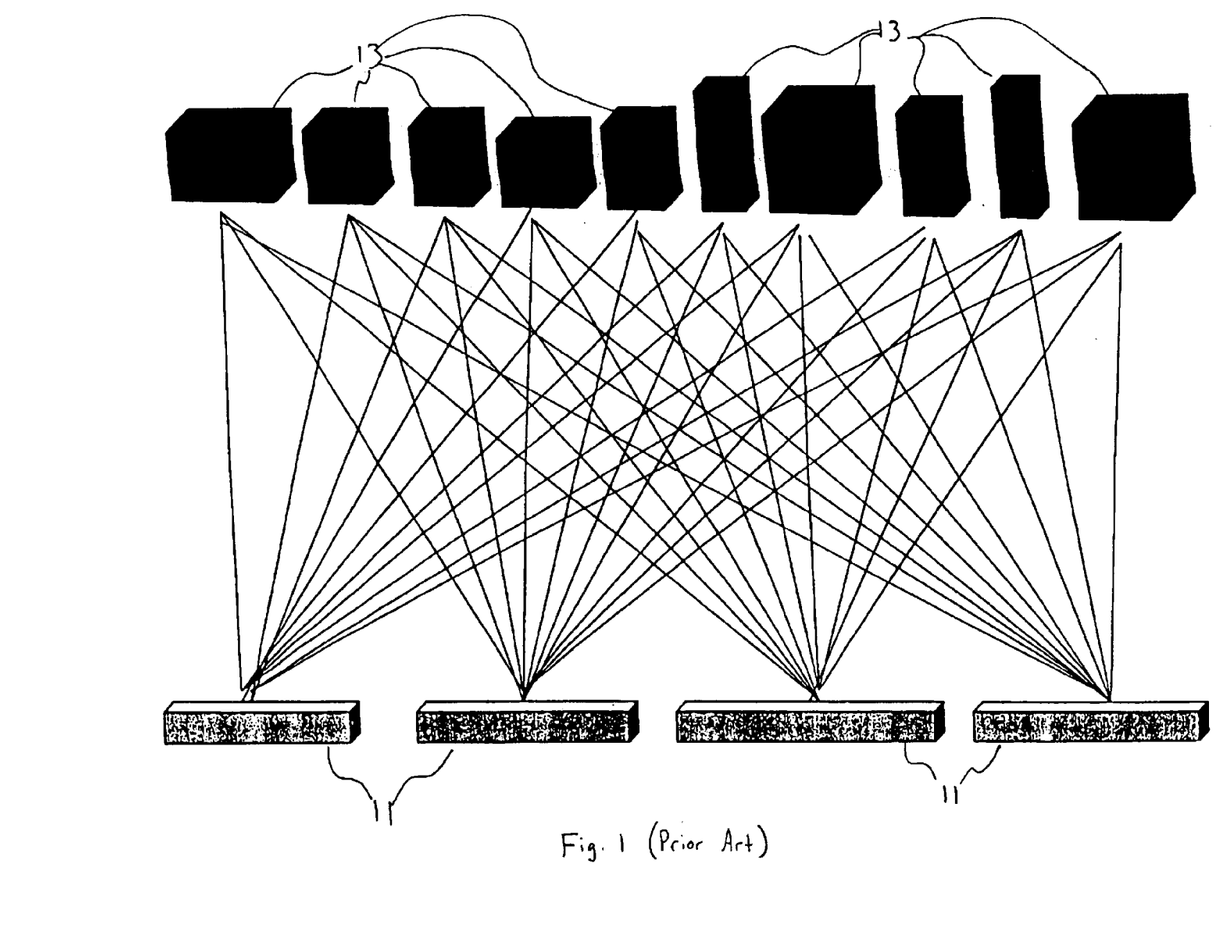
FIG. 1 is a schematic representation of traditional prior art transaction management.

For each buying company, there are many selling companies with which it is a trading partner. For each selling company, there are many buying companies with which it is a trading partner. The buying companies and the selling companies must each track their accounts payable and accounts receivable information for each of the companies with which they do business. This can be illustrated as in FIG. 1, representing the traditional interactions between businesses.

Thousands of companies each perform billing, invoice matching, and reconciliation activities independently and redundantly, despite the fact that they are all using the same source data, namely, the data from the purchase orders and corresponding invoices and receipt documents. The results of these activities are then shared between these companies via remittances, short pays, claims, etc. This business process can create unnecessary administrative confusion and expense.

Electronic billing, remittance, payment, and tracking technologies have generated limited savings because they have left the reconciliation environment within each individual company. Also, web-based billing and payment solutions have achieved some success in moving information between companies, but have required companies to maintain their own internal accounts payable and accounts receivable functions which may require a significant commitment of resources.

There are existing systems that coordinate customer billings and receipts for a single selling company. However, such a system generally does not allow for the buying companies that are customers of that selling company to access the financial information that is related to the buying company's account. Likewise, such systems generally do not coordinate the supplier billings and receipts for the buying company for suppliers other than that selling company. In short, the systems are selling company-based.

Other systems provide only electronic presentation of invoices to buying companies, requiring manual approvals, payments, and resolution of any discrepancies. Also, those systems require manual matching of the presented invoices with the corresponding purchase orders and receipt documents. These reconciliations are not done automatically. One such system is operated by Miradiant.

There is a need for a single transaction platform that can process transactions on both sides between trading partners based on a single set of data. There is also a need for a one-source aggregation of the accounting data from multiple trading partners to more efficiently process transactions between them.

The processing of purchase orders and invoices and the associated discrepancy resolution is a costly, but largely neglected, problem to all industries. There is a need for a system that will address these redundancies in the discrepancy resolution process and reduce the unnecessary administrative infrastructure associated with the processing of invoices and purchase orders between individual trading partners or between multiple trading partners.

SUMMARY OF THE INVENTION

It is an object of this invention to provide a single interactive transaction platform in which both buying companies and selling companies share related accounts receiving data, receipt data, and accounts payable data with their corresponding suppliers and/or purchasers. It is also an object of the present invention to minimize the redundancy inherent in having several businesses conduct discrepancy resolution reviews with the same data which minimizes resources required by companies to resolve discrepancies between invoices and purchase orders. It is a further object of the present invention to provide for matching data relating to purchase orders, invoices, and receipt of goods efficiently. It is yet a further object of the present invention to allow flexible tolerance- and rules-based matching at the header and the detail levels to provide further efficiency in the discrepancy resolution process.

The present invention also provides efficient error resolution by automatically identifying particular discrepancies to the buying company and the selling company for resolution in the workflow adjudication process. The present invention also provides a web-based solution to transaction processing, which further improves efficiency of the process by utilizing a global computer network, such as the internet.

These and other advantages of the present invention will be apparent to those skilled in the art in view of the foregoing description of some objects of the present invention taken together with the following detailed description, appended claims, and accompanying drawings.

The present invention provides a method and a system by which buying companies and selling companies utilize a single transaction point to capture and process financial and accounting transactions between trading partners. The present invention provides for management of financial and accounting transactions for a single company that both buys and sells items to the same or different trading partners, as well as for individual buying companies and/or individual selling companies that have a single or multiple trading partners.

The present invention further provides a method and a system for processing transactions between at least one buying company and at least one selling company by using a database of purchase order data and invoice data to match data from purchase orders with corresponding data from invoices. In accordance with the present invention, data corresponding to a purchase order with at least one entry is obtained. The purchase order data includes purchase order header information, receipt data, and purchase order detail information. The purchase order header information includes, but is not limited to, a purchase order number, total cost for the products on the purchase order, client identification, a buyer identification, a vendor identification, purchase order date, and actual order date. When this purchase order header information is input into the database, information such as a client number may also be provided. Receipt data includes the quantity of each item received and the total cost of goods received.

Data corresponding to invoices having at least one entry for products that were shipped are also obtained. The invoice data includes invoice header information and invoice detail information. The invoice header information includes, but is not limited to, the invoice number, the corresponding purchase order number, the total cost of the products shipped, the buyer identification, the invoice date, and the order date. Other invoice header information, such as the client identification and vendor identification, may also be obtained when entering this data into the database.

Selected purchase order header information is then compared with corresponding selected invoice header information, preferably automatically by a computer, to identify a matched record of purchase order data and corresponding invoice data. Once a matched record is identified, the total cost of goods received is compared with the total cost from the invoice data according to a predetermined tolerance. Such a tolerance may be expressed as a percentage of the total cost, as an absolute dollar figure, or in any other manner. If these total costs are within the predetermined tolerance, then the present invention provides for payment of invoices corresponding to invoice data having matched purchase order data within the tolerance.

If the total costs are not within the predetermined tolerance, then predetermined purchase order detail information is compared to predetermined invoice detail information according to predetermined rules. The rules may include such rules as paying the lower of the invoice cost and the purchase order cost. This purchase order and invoice detail information includes, but is not limited to, line by line breakdowns of the quantity of product ordered, price per product unit, and quantity received for each product on the purchase order and the corresponding invoice.

If the compared detail information satisfies the predetermined rules, then the present invention provides for the payment of all or part of the invoice corresponding to the invoice data having matching purchase order data.

If the compared detail information does not satisfy the predetermined rules, then either the buying company is notified for resolution of purchase order data not matching invoice data, or the selling company is notified for resolution of invoice data not matching purchase order data, or both.

The method and system of the present invention further allow for improved factoring because the receivable may be sold after the matching has occurred, this minimizing the risk to the third party purchasing the asset.

The present invention also provides for a system for performing these steps, including a data input center for receiving purchase order data and invoice data, a database for storing this data, an application platform for automatically comparing selected purchase order data with corresponding selected invoice data, and a communication interface with the buying company and the selling company for resolving discrepancies between the purchase order data and the invoice data.

DETAILED DESCRIPTION OF THE PREFERRED EMBODIMENT

FIG. 1 schematically illustrates the traditional prior art approach to management of financial and accounting transactions between trading partners, including buying companies 11 and selling companies 13. It is to be understood that buying companies 11 and selling companies 13 include individuals, sole proprietorships, partnerships, limited liability companies, corporations, and any other business or non-business entities engaged in the buying and selling of products that may be included in purchase orders and/or invoices. Further, the term "products" includes raw materials, finished products, services, and/or any other item that may be included in purchase orders, invoices, or other billing arrangements.

Figure 2:
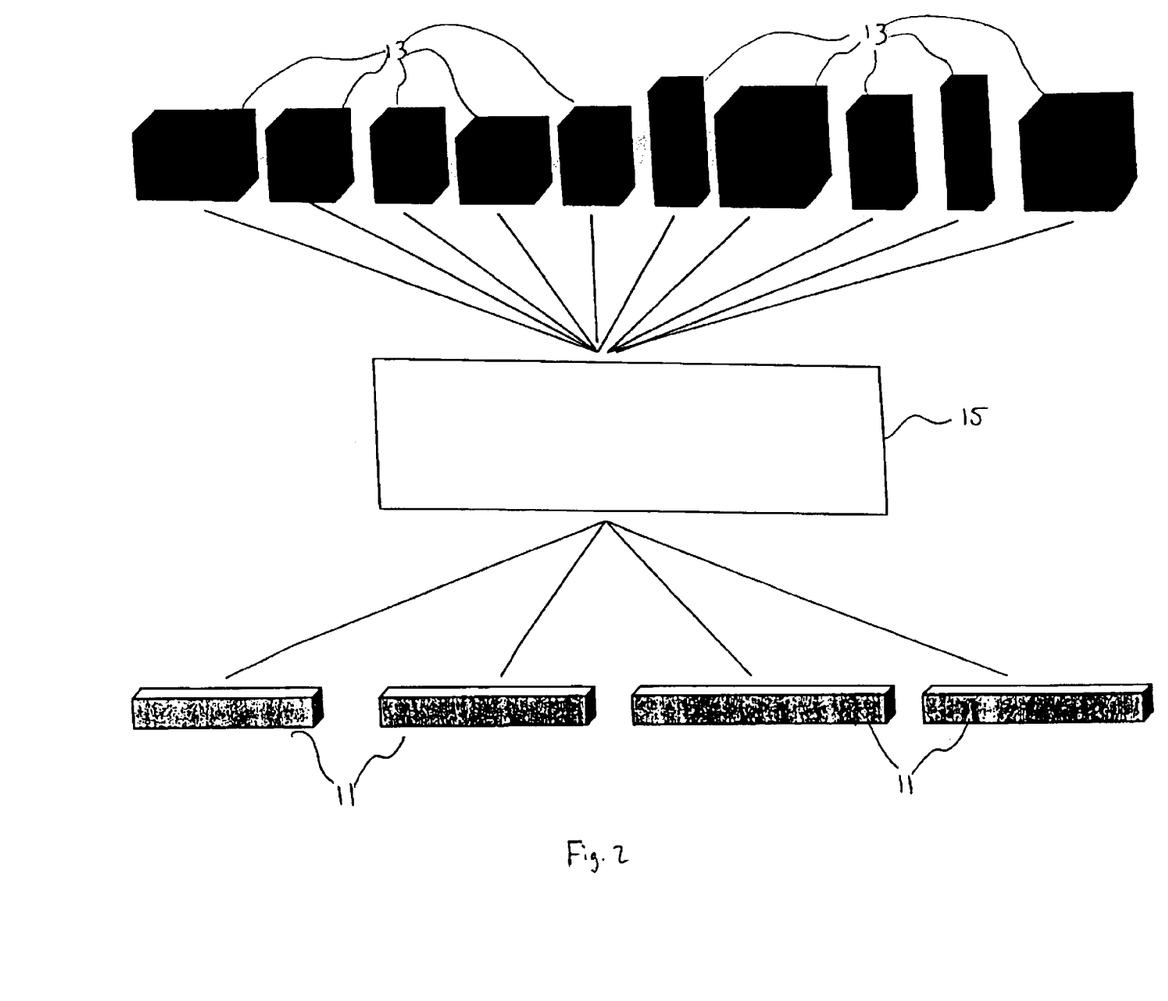
FIG. 2 is a schematic representation of transaction management in accordance with the present invention.

FIG. 1 shows that individual buying companies 11 and selling companies 13 internally manage the financial and accounting data related to their trading partners. This leads to inefficiencies and other difficulties described above. FIG. 2 presents a schematic representation of the present invention in which a single interactive platform 15 is provided for both buying companies 11 and selling companies 13 to utilize as a single transaction point to manage financial and accounting transactions with their trading partners. Platform 15 may be operated by a third party and may be accessible by all parties via a computer network. Preferably, this computer network is a global computer network, and most preferably the computer network is the internet.

Both buying companies 11 and selling companies 13 provide their purchase order data, receipt data, and invoice data to the interactive platform 15, where the data is managed, discrepancies resolved, payments provided for, and records kept. The trading partners complete transactions and communicate with each other via the interactive platform 15. Reports relating to transactions, financial data, and other accounting data are available via the interactive platform 15.

The interactive platform 15 provides a unique method and system for a third party to manage all of the accounts payable and accounts receivable for buying companies 11 and selling companies 13. Further, interactive platform 15 may provide for centralized payment schemes, as authorized by buying companies 11, and can conduct all of the account payable operations currently processed within the buying company 11. Likewise, the interactive platform 15 can conduct all of the account receivable operations currently processed within the selling company 13. The interactive platform 15 conducts these accounts receivable and accounts payable operations utilizing identical data from a single database.

Interactive platform 15 may also provide for management of transactions between buying companies 11 or selling companies 13 with a trading partner that does not provide corresponding accounting information to the interactive platform 15. For example, if a buying company 11 purchases goods from a trading partner that does not provide invoice data to the interactive platform 15, the input of purchase order information, receipt information, and invoice information may still occur via the buying company 11, and the buying company 11 will still enjoy the advantages of using interactive platform 15. Also, the buying company 11 may direct the selling company 13 to send all invoices to the interactive platform 15 as part of the billing arrangements with that selling company 13. However, the trading partner that does not provide information to the interactive platform 15 may not have access to the data in the interactive platform 15 or the advantages of its use.

The interactive platform 15 is not limited to traditional goods-oriented transactions, but is also applicable to exchanges of services, routine payments, or any other payable or receiving function traditionally performed by an accounting department. For example, the interactive platform 15 may be utilized to provide for payment of regular utility bills. A rule or other operating parameter may be established for a buying company 11 that an electric bill within a predetermined range is authorized for payment. The selling company 13, which happens to be an electric utility, then provides the payment due information to the interactive platform 15, and payment is automatically provided for if the amount is within the authorized predetermined range. Any amounts outside the predetermined range would trigger a resolution process similar to that described below in relation to FIG. 7.

The buying company 11 may access the interactive platform 15 at any time for reports regarding the payments of electric utility bills to that selling company 13, and the selling company 13 may access the interactive platform 15 at any time for reports regarding the payments made to it by that buying company 11 or any other buying company 11. Of course, that buying company 11 would not have access to reports of information regarding payment to that selling company 13 by any other buying company 11. In such a way, a buying company 11 may automate all routine payment processes and increase accounting efficiency.

Other examples of the utilization of the interactive platform 15 include selling companies 13 that are insurance companies and buying companies 11 that are the insured companies. Procedures similar to those described above could be implemented to automate provisions for insurance. It will be recognized by one with skill in the art that the interactive platform 15 may be customized and have individual features desired by the user, not limited to those features herein described. The interface to the interactive platform 15 allowing access by the buying company 11 or selling company 13 may also be customized and is not limited to the features herein described.

FIGS. 3 through 9 illustrate a preferred embodiment of the present invention. This embodiment discussed herein is not intended to be limiting to this invention. It is exemplary of the invention and is only provided to illustrate a preferred embodiment of the invention.

Figure 3:
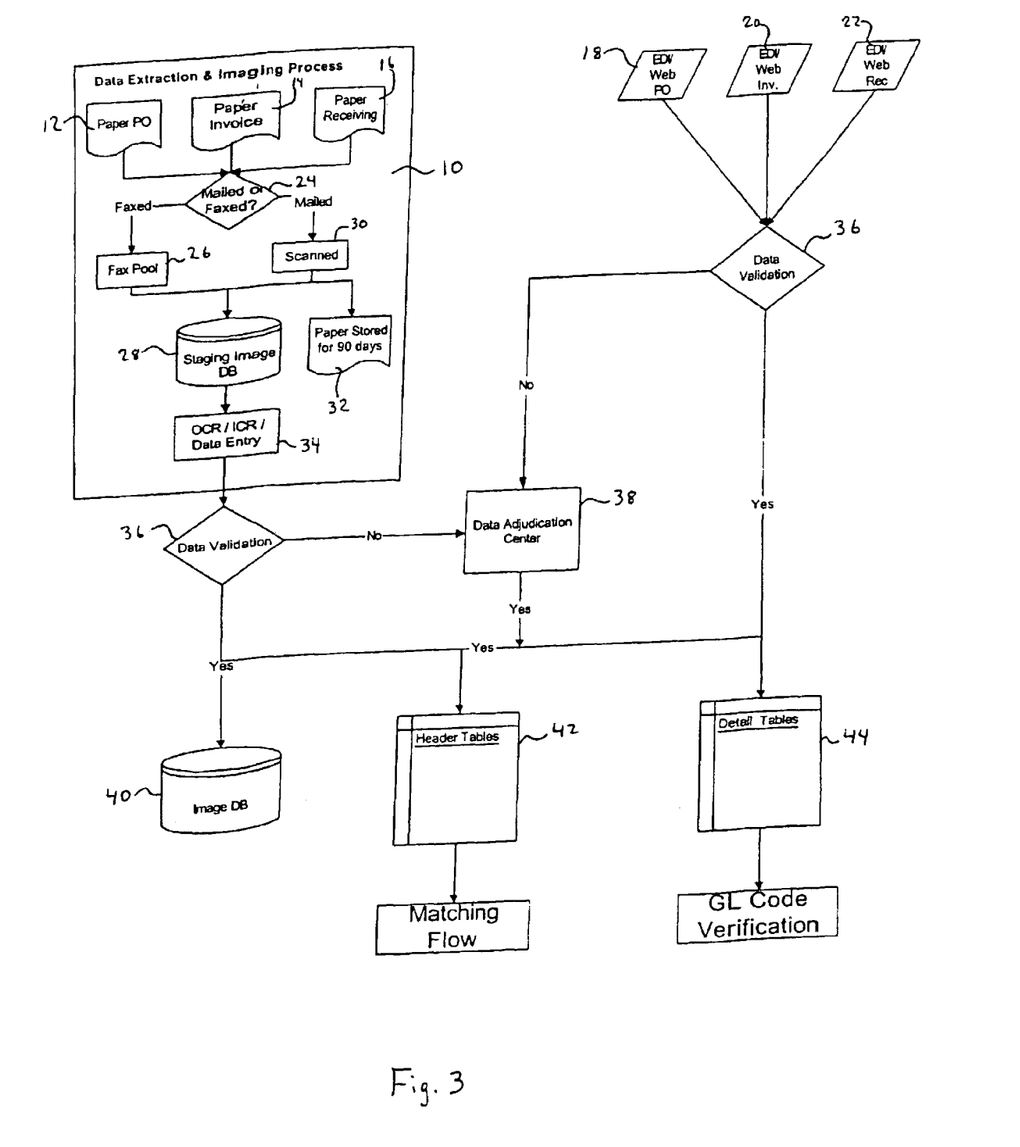
FIG. 3 is a flow diagram of the input data flow of the present invention.

FIG. 3 illustrates a schematic representation of a preferred embodiment of present invention relating to input accounting data flow to the interactive platform 15. Accounting data for the method of the present invention may be obtained in either paper format, such as paper purchase orders 12, paper invoices 14, or paper receiving document 16, or in electronic format, such as electronic data interface ("EDI")/Web purchase orders 18, EDI/Web invoices 20, or EDI/Web receiving documents 22. These documents may be received via the World Wide Web over the Internet or through an EDI system.

The paper documents 12, 14, and 16 may be received via paper delivery service (e.g., U.S. mail) or via facsimile transmission. The next step is to determine whether the paper is received via mail or facsimile transmission, as indicated by numeral 24. If the paper documents are received via fax, then the images will be sent to a fax pool 26, and into a staging image database 28.

If the paper documents 12, 14, and 16 are received via paper delivery service, then the documents are scanned in step 30, using conventional scanning techniques. After the paper documents 12, 14, and 16 are scanned, then the images resulting from the scan are provided to the staging image database 28. With paper documents 12, 14, and 16 that are received via paper delivery service, the hard paper copies are placed in storage 32. The paper may be stored for any amount of time, preferably 90 days.

Once the images of the paper documents 12, 14, and 16 are stored in the staging image database 28, they are then provided to the data entry step 34 in which the images are translated into an electronic format that is suitable for further processing.

Once the data has been entered into the system through step 34, the data is evaluated and validated in step 36 to identify data that may be missing, incorrectly input, etc. If the data validation step 36 identifies any problems, then the document is provided to the data adjudication center 38 for resolution of any problems. The data adjudication center 38 may provide for contact with the provider of the information for correction of that information. Such contact may be conducted as part of the workflow resolution 60 process described in FIG. 7, or may be separate from that process.

The electronic data 18, 20, and 22 also undergoes the data validation step 36 and is provided to the data adjudication center 38 for resolution of any problems with that data.

Once the documents have passed the data validation step 36, the images of the documents will be stored in the image database 40. Specific data from the images will be loaded into the header tables 42 and/or the detail tables 44.

For purchase order documents 12, 18, header table 42 data may include a purchase order number, a client number or other identification, a vendor number or other identification, a buyer number or other identification, a purchase order date, and an order date. For invoice documents 14, 20, header table 42 data may include an invoice number, a purchase order number, a client number or other identification, a vendor number or other identification, a buyer number or other identification, an invoice date, and an order date. The invoice documents 14, 20 also have an invoice total cost, which is the total cost or price of the product(s) shipped to the buying company 11 from the selling company 13.

It is to be noted that the embodiment disclosed contemplates that the buying company is the client, but it is to be recognized that the selling company could also be the client. Further, while reference is made to buying company, selling company, client, and vendor, it is to be recognized that these terms include individuals, sole proprietorships, partnerships, limited liability companies, corporations, and any other business or non-business entities engaged in the buying and selling of products that may be included in purchase orders and/or invoices. Further, the term "products" includes raw materials, finished products, services, and/or any other item that may be included in purchase orders, invoices, or other billing arrangements.

For purchase order documents 12, 18, detail table 44 data may include the purchase order header information and detailed entry information by line of the purchase order including an item number or other identification, a quantity ordered of that item, a cost per item unit, an extended price for that item, a charge code for that item, and a quantity received for that item. For invoice documents 14, 20 detail table 44 data may include the invoice header information and detailed entry information for each line of the invoice, including an item number or other identification, a quantity of the item shipped, a unit cost or price for the item, and an extended cost or price for the item. Likewise, if freight charges, insurance charges, etc., are included as separate items, then these could also be included as separate line items.

Receiving documents 16, 22 provide receipt data corresponding to the product(s) actually received by the buying company 11, on an item-by-item basis. This information is provided by the buying company 11 and is combined with information from the purchase order to determine the total cost of goods received, which is the cost or price of the product of products ordered that were actually received by the buying company 11. The total cost of goods received may be included in the purchase order header information 42*a*. The quantity of items received and the cost of individual items received may be included in the purchase order detail information 44*a*.

Figure 5:
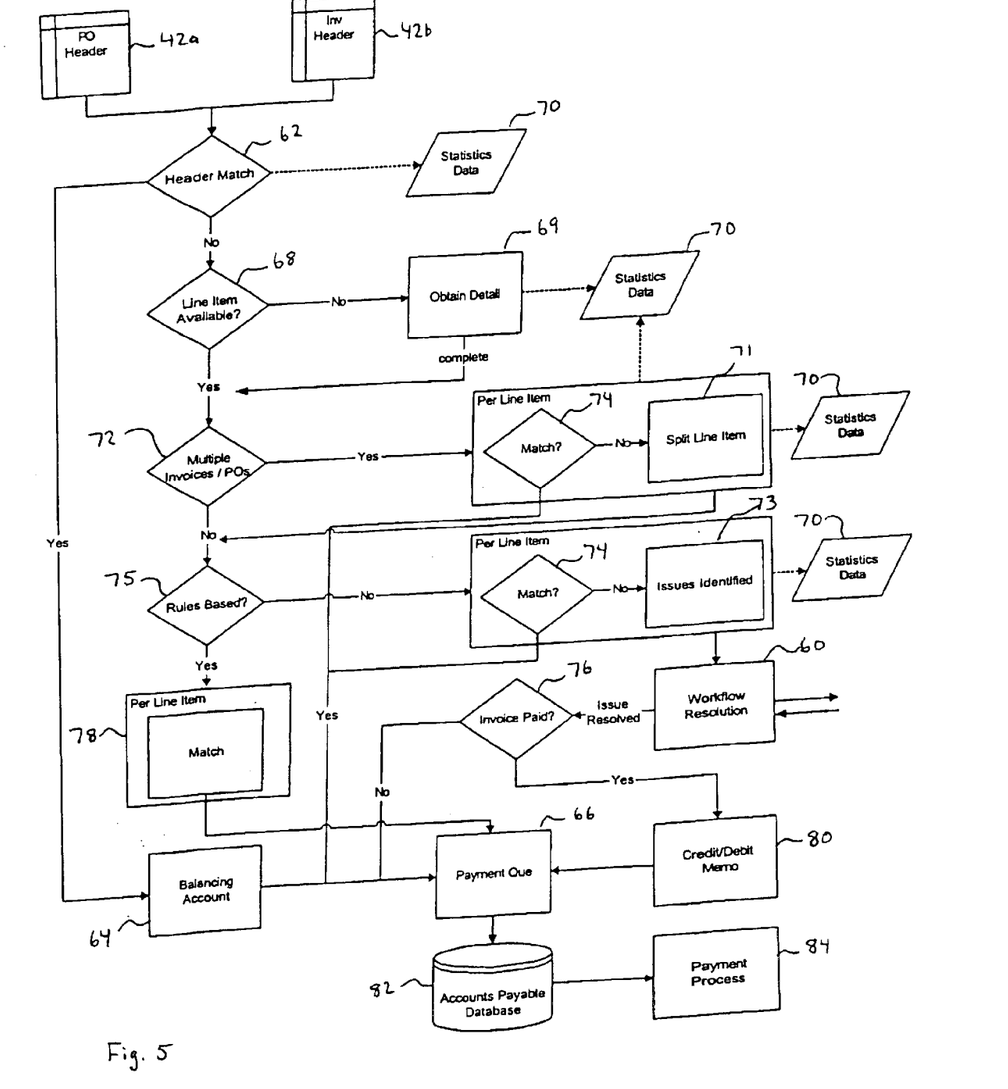
FIG. 5 is a flow diagram of the matching process of the present invention.

The data from the header tables 42 is provided to begin the matching flow process described in FIG. 5. The data from the detail tables 44 undergoes general ledger ("GL") code verification, in which the detailed codes set forth in the data of the detail tables 44, generally obtained from the purchase order, are compared to predetermined GL codes provided by the originator of the data.

Figure 4:
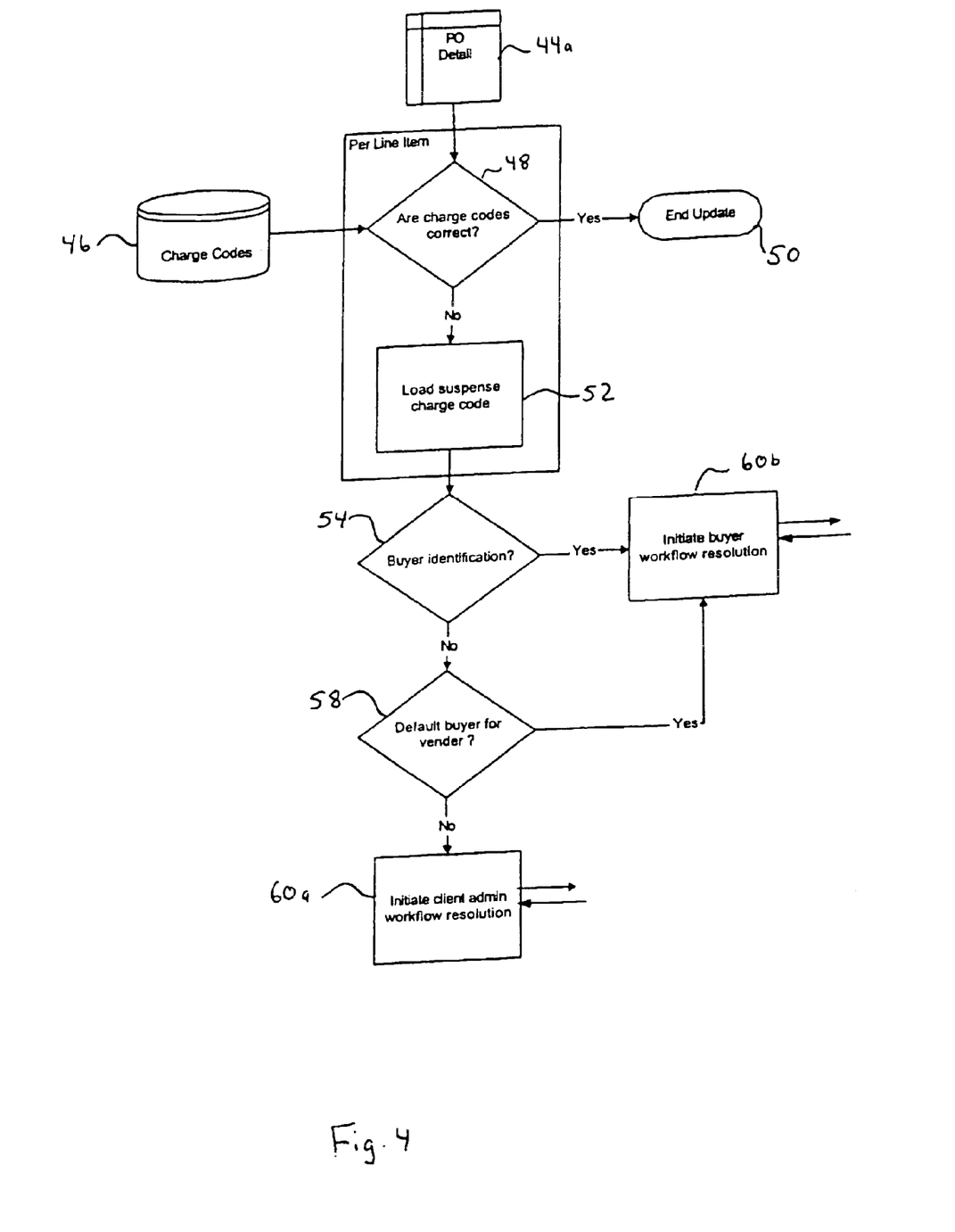
FIG. 4 is a flow diagram of the charge code verification process of the present invention.

A preferred embodiment of the GL code verification flow diagram is illustrated in FIG. 4. The data from the detail tables 44*a* relating to purchase order 12, 18 information is compared to charge codes 46 that are provided by the originator of the purchase orders 12, 18. The comparison of the charge codes from the purchase order detail table 44*a* and the charge codes 46 occur on a line-by-line basis to ensure that the codes contained in the detail table 44*a* are valid codes. This step occurs as charge code verification step 48. If the codes from the detail table 44*a* match the charge codes 46, then the update of the codes is ended at step 50. If the charge code verification step 48 indicates that the charge code from the detail table 44*a* does not have a corresponding authorized code from charge codes 46, then suspense charge codes will be assigned to the items corresponding to the non-matching charge codes in step 52. A suspense charge code is an accounting placekeeper pending resolution of the correct charge code. The suspense charge code and the original charge code will then be associated with that particular item on the particular line in question.

Then step 54 queries the detail table 44*a* to determine if there was a buyer associated with the purchase order. If there is a buyer identified, then the buyer workflow resolution will be initiated in step 60*b*. In this step, the individual buyer associated with the purchase order in question is contacted (through the internet, web site, etc.) to resolve the discrepancies between the authorized charge codes from the charge code database 46 and the charge codes from the detail tables 44*a*.

If there is no buyer identified in the data from the detail tables 44*a*, then it is determined whether there is a default buyer for the vendor identified on the purchase order in step 58. This is determined by comparing the vendor from the data in the detail tables 44*a* with a predetermined list (not shown) of default buyers for vendors obtained from the originator of the purchase order 12, 18.

If there is a default buyer for the vendor identified in step 58, then the buyer workflow resolution 60*b* is initiated to resolve discrepancy between the charge codes. If there is not a default buyer for the vendor identified in step 58 and no buyer identified from the detail tables 44*a* in step 54, then the matter is referred to the client administrative workflow resolution 60*a*, discussed in greater detail below.

FIG. 5 is a flow diagram that illustrates a preferred embodiment of the matching flow of the present invention. Purchase order header information 42*a* is obtained from the header tables 42 and compared against invoice header information 42*b* obtained from the header tables 42. Corresponding purchase orders and invoices are selected based upon matching identified information, such as purchase order number, client number, and vendor number. Then the total cost of goods received and invoice total cost are compared in step 62 to determine if the total cost matches within a predetermined tolerance level. This tolerance level may be based on a dollar amount, percentage of total cost, or other criteria. If the total costs match within the tolerance, then whatever difference between the total costs are coded to a balancing account 64 and the invoice is then processed to the payment queue 66.

Whether the total costs match or not, the costs and matching status information is provided to the statistics area 70 for tracking and further compilation. The statistics area 70 may also be used to create a digital audit trail, in which transactions, resolutions of discrepancies, and access to the system by particular individuals may be tracked. If the total costs do not match, then the detail tables 44 corresponding to the purchase order and invoice are checked to see if detailed information regarding each line item on the purchase orders or invoices is available, as identified in step 68. Whether the total costs match or not, that information is provided to the statistics area 70 for tracking and further compilation. If the detail required is not available, then step 69 illustrates that the appropriate detail is obtained. This may be accomplished by obtaining the data from the image database 40, or accessing the data adjudication center 38 to have the appropriate data input. Whether the detailed information is available and the method of obtaining the detailed information are supplied to the statistics area 70.

In step 72, it is determined whether there are multiple invoices or purchase orders having matches with header information. For example, a single invoice may correspond to more than one purchase order, or the products from a single purchase order may have been shipped under different invoices. If there are multiple invoices and/or purchase orders, then the detail information regarding individual line items are compared for matching in step 74. If there are individual line item matches between the purchase orders, including receipt data, and the invoices, then those may be provided to the payment queue 66. If the line items of the associated purchase orders with receipt data and invoices do not match, then the unmatched line items are identified for further processing. All of this information is also provided to the statistics area 70.

Whether there may be multiple invoices for a particular purchase order is a set-up rule that may be selected by the customer. If a customer does not choose to allow multiple invoices per purchase order and a purchase order has more than one invoice matching the header information, this matter is forwarded to the workflow resolution process 60. If a customer does accept multiple invoices per purchase order, and the line item match 74 indicates that there is not a match for a particular purchase order line item because the corresponding invoice(s) has a lesser quantity than the purchase order or receipt data for that line item, then the line item is split in step 71 to become two line items-one with the quantity that is on the invoice or that was received and one line item with the remainder of the quantity that can be the subject of a different invoice or receiving document for the remaining quantity or part thereof.

If there were no multiple invoices or purchase orders, or if there were split line items from step 71, then the purchase orders with receipt data and invoices are compared with predetermined selections from the customer regarding the rules by which to pay the invoices in step 75. If there is not a preselected rule by which to pay the invoice associated with the purchase order or the split line items, then the line items from the detail tables 44 of the purchase order with receipt data are compared to those from the invoice to determine if there is a match 74. If there is a line item match (e.g., the item number, quantity, extended price matches between the purchase order and invoice), then the line item may be forwarded to the payment queue 66.

For line items that do not have corresponding matches between the purchase order with receipt data and the invoice, these issues are identified in step 73 and may be provided to the workflow resolution 60 for resolution. See FIG. 7. If the customer has allowed multiple invoices per purchase order, then the unmatched line items may be placed on hold for a period of time pending separate invoices. This period of time may also be selected by the customer, and may be of any duration. Preferably, this period of time does not extend past 30 days, beyond which the customer may be contacted through the workflow resolution 60. There may also be a provision for items that have been placed on back-order status, such that a separate period of time is specified before the issue is provided to the workflow resolution 60.

Data regarding line item matches and discrepancies are also provided to the statistics area 70. Once the issue is resolved through workflow resolution 60, step 76 queries whether the invoice or associated line item has been paid. If the invoice or associated line item has not been paid, then the information is provided to the payment queue 66. If the invoice has been paid, then a credit or a debit memo is generated in step 80 and provided to the payment queue 66.

If the invoice or line item is to be paid according to rule, as identified in step 75, then the rule is applied to the matches in step 78 and the results are provided to the payment queue 66. One such rule that may be used is the "pay lower of the two rule." This is a set of rules that evaluates the invoice line item and the purchase order line item and compares extended price. This rule allows that the lower price between the two items is paid for the quantity of items received, or the lowest quantity of the two line items is selected and an extended price is calculated based upon a predetermined formula. It will be readily apparent to one of ordinary skill in the art that there are many rules-based alternatives for resolving how an invoice or line items upon an invoice should be paid. The method of the present invention envisions any rules-based payment scheme. A rules-based payment scheme may also be applied with multiple invoices and purchase orders.

The information from the payment queue 66 is provided to an accounts payable database 82, from which the payment process 84 is initiated. Differences between the amount invoiced and the amount paid are provided to the balancing account 64. The payment process 84 may be entirely controlled and contained by the originator of the purchase orders and outside the system of the present invention. The payment process may also be as described in FIG. 8. It will be apparent to one of skill in the art that many different payment processes may be provided for without departing from the spirit of the invention.

The information from the accounts payable database 82 may also be used in the process of factoring, described above, to create an improved process termed "approval factoring." Factoring, the selling of the receivable asset associated with amounts due to the selling company, is done at the time of the match (or approval for payment, discussed below) between the purchase order and receiving information or data with the invoice information or data, instead of the traditional method of selling the receivable at the time of invoice. This allows the factoring to occur based on a matched amount due. By factoring at the time of match or approval, the risk to the third party associated with the receivable asset is minimized, because the matching or approval for payment has already occurred and any discrepancies have already been resolved, or at least identified.

Because of this reduced risk, the discount from the face value of the receivable may be reduced and the selling company will pay less of a fee to better manage its cash flow by receiving the cash flow at known dates with minimal delay. Further, the factored amount may be based on the amount actually scheduled to be paid, instead of the invoice amount, and allows for factoring over multiple invoices having only partial matches. Thus, factoring may be done for individual line items from several invoices, instead of for an entire invoice, as is traditionally done. The third party may be the party implementing the present invention or may be one or more other parties, such as a bank or other receivables factoring party.

Figure 6:
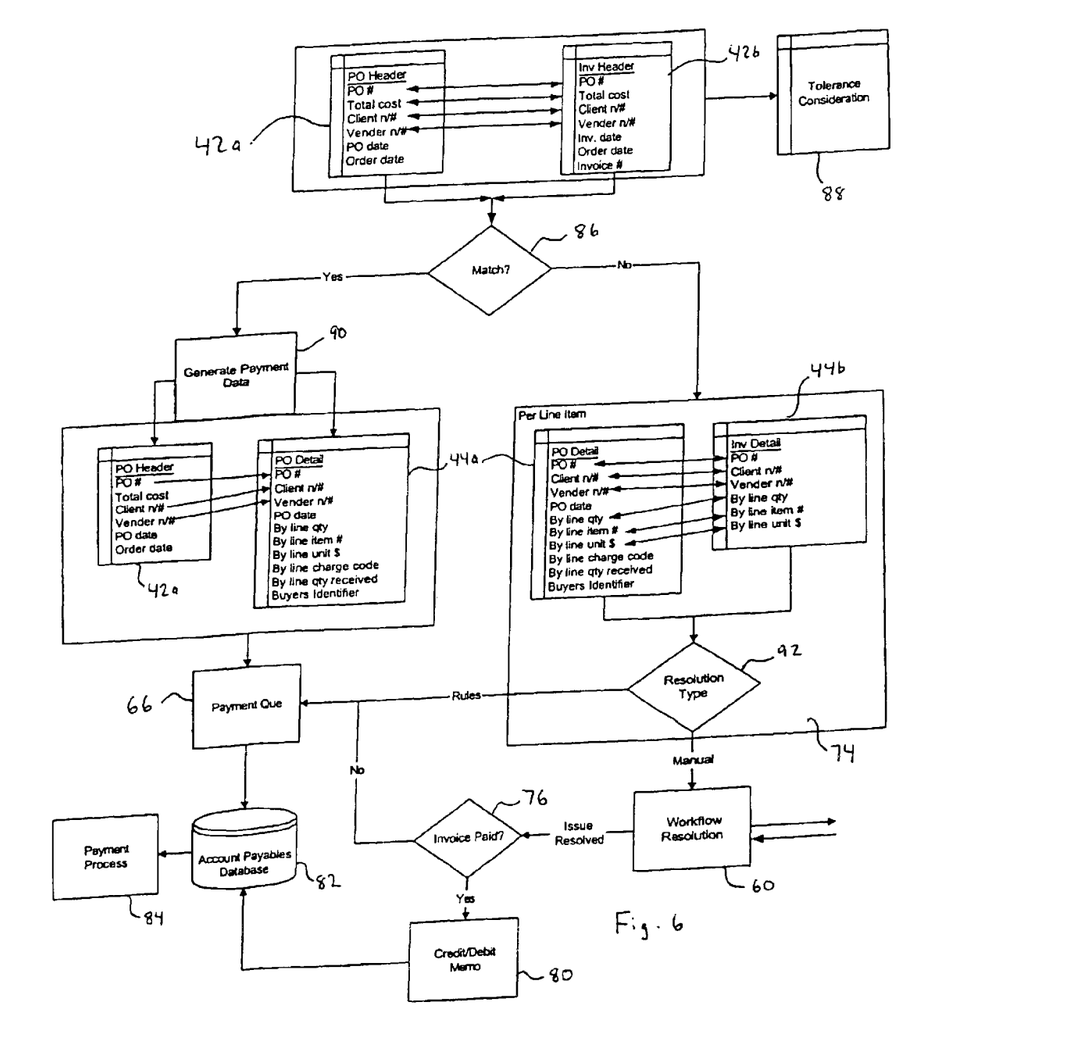
FIG. 6 is a schematic representation of the matching logic process of the present invention.

FIG. 6 illustrates a preferred embodiment of the matching logic in more detail. Initially, the information from purchase order header table 42a and invoice header table 42b are compared to see if there is a high level match 86 between this information. Typically, the header information compared is the purchase invoice number, the total cost of goods received, the total cost of products shipped, the client number or other identification, and the vendor number or other identification. Obviously, it is within the spirit of the invention to omit comparing some of this information or to provide that additional header information is to be compared.

When comparing the information from purchase order header table 42a and invoice header table 42b, the tolerances from tolerance consideration table 88 are to be factored in. The data in tolerance consideration table 88 is predetermined data and may be different depending upon the client or vendor. This data may be modified.

If there is a match of the header information within the tolerance, then payment data is generated in step 90. The payment data is generated by accessing or retrieving the purchase order detail table 44a information for the corresponding purchase order header table 42a information. Then this information is provided to the payment queue 66, the accounts payable database 82, and on to the payment process 84. Data may be provided to the balancing account 64, for example, if there are minor discrepancies between the total cost of goods received and the invoice total cost.

If the purchase order header table 42a information and the invoice header table 42b information do not match in the high level match 86 step, particularly relating to the comparison of the total cost of goods received and the invoice total cost, then the line item match step 74 occurs comparing the purchase order detail table 44a information with the invoice detail table 44b information. As illustrated, this information may include purchase order number, client number, vendor number, by line quantities (shipped and received), by line item numbers, and by line cost per unit. It is within the spirit of the invention to omit some of these comparisons or to provide further comparisons, depending on the preferences of the user. It will be recognized that every step described need not be performed; often the matching process will be complete without conducting every step.

Figure 7:
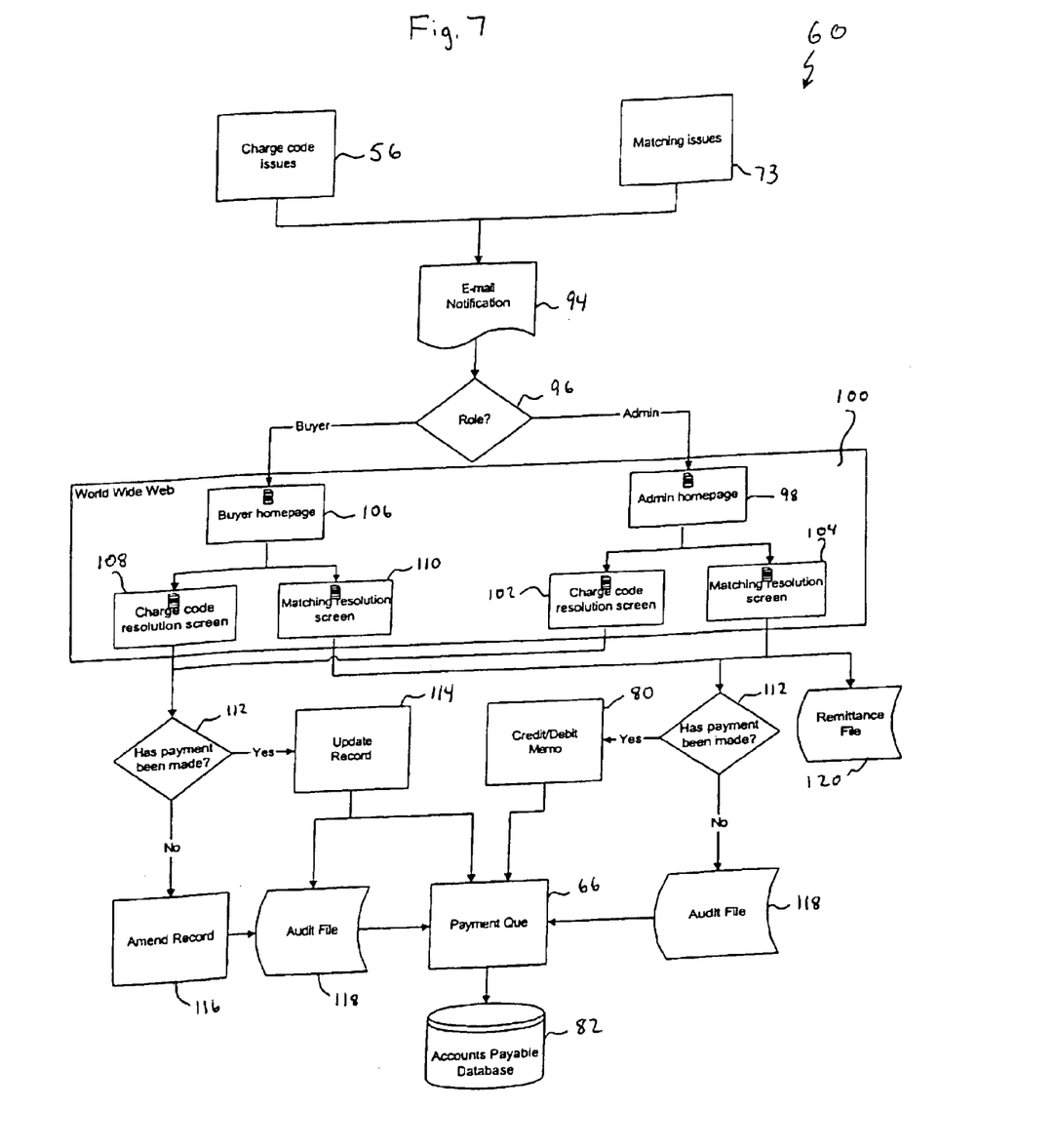
FIG. 7 is a flow diagram of the resolution process of the present invention.

If individual line items match, or if a rules-based scheme is employed to resolve differences between line items, then resolution step 92 will provide the information to the payment queue 66. If there is no match and no rules-based scheme to resolve the discrepancies, then the matter is referred to the workflow resolution 60, as illustrated in FIG. 7. Once the issue is resolved, then a determination is made whether the invoice has been paid in step 76. If the invoice has not been paid, then the information is provided to the payment queue 66. If the invoice has been paid, then a credit or debit memo is generated in step 80 and provided to the accounts payable database 82.

FIG. 7 illustrates a preferred embodiment of workflow resolution 60 process. This is the process that resolves any discrepancies identified during execution of the method of processing transactions according to the present invention. If there are issues from the charge code verification process illustrated in FIG. 4 that require administrative workflow resolution 60a or buyer workflow resolution 60b, collectively referred to as charge code issues 56, or if there are issues from the matching flow process illustrated in FIG. 5 and identified at step 73, then those issues are identified to the client by email notification 94. It will be recognized by one with skill in the art that other notification processes may be used. The email notification 94 includes some statistical information on the status of the charge code issues 56 or matching issues 73 and will identify the role 96 of the issues as either administrative issues 60a or buyer issues 60b. If the issue is an administrative issue, the email notification 94 will direct the client to the administrative homepage 98 on the World Wide Web 100. It will be recognized by one of skill in the art that the World Wide Web 100 is not the only means by which such a homepage may be accessed, but is a preferred embodiment of the network through which the administrative homepage 98 is accessed. Other networks, such as a Local Area Network (LAN) or a Wide Area Network (WAN), or any other computer network may be used to access the administrative homepage 98. Further, the administrative homepage 98 may be of any format suitable for performing the functions described herein.

Two of the screens available for access from the administrative homepage 98 are the administrative charge code resolution screen 102 and the administrative matching resolution screen 104. Through the administrative charge code resolution screen 102, any of the charge code issues 56 that have been identified may be resolved. Through the administrative matching resolution screen 104, any of the matching issues 73 may be resolved.

If the email notification 94 identifies that the issues to be resolved are associated with a particular buyer, then the email notification 94 will direct the client to a buyer homepage 106, accessible via the World Wide Web 100. As with the administrative homepage 98, the buyer homepage 106 may be accessed through any of a variety of computer networks, and is not limited to merely access through the World Wide Web 100. Two of the screens available from buyer homepage 106 include the buyer charge code resolution screen 108 and the buyer matching resolution screen 110. Through the buyer charge code resolution screen 108, charge code issues 56 associated with that buyer may be resolved. Likewise, through the buyer matching resolution screen 110, matching issues 73 associated with that buyer may be resolved. There may be many different buyer homepages 106, depending upon the number of buyers associated with that particular client. Each of the buyer charge code resolution screens 108 and buyer matching resolution screens 110 may also be accessed from the administrative homepage 98 for that client, if such authorization is desired by the client. However, the administrative charge code resolution screen 102, the administrative matching resolution screen 104, and other buyer homepages 106 may not be accessed from a particular buyer homepage 106. It is to be recognized that the homepages 98, 106 may be of any format and are customizable to meet the needs of the user/client.

Once the charge code issues 56 have been resolved through either the administrative charge code resolution screen 102 or the buyer charge code resolution screen 108, the next step, identified as 112 on FIG. 7, is to determine if payment has been made for the particular item for which there was a charge code issue 56. If payment has been made, then the records associated with the charge code issue are updated in step 114. If the payment has not been made, then the records associated with the charge code issue 56 are amended and the proper detail table 42, 44 is amended in step 116. After the records have been updated or amended, the data is provided to an audit file 118 to document the update of the codes in the records. The information is then passed to the payment queue 66 and subsequently to the accounts payable database 82.

Once the matching issues 73 have been resolved via the administrative matching resolution screen 104 or the buyer matching resolution screen 110, then the next step is to determine whether payment has been made in step 112. Concurrently, remittance file 120 is updated with information such as the buyer who resolved the issue, the date, the changes that have been made, etc. If payment has been made, then a credit/debit memo 80 is generated and forwarded to the payment queue 66 that then loads the information to the accounts payable database 82. If payment has not been made, then the audit file 118 is updated documenting the changes and updates that have been made. Then the record is forwarded to the payment queue 66 and on to the accounts payable database 82.

The system and method of the present invention may also provide for tracking of the history of the workflow resolution process, including who accessed or participated in the resolution, the dates and times such access occurred, and the messages exchanged or provided to the system. This may be advantageous in the event that disagreements arise over the resolution, future similar discrepancies are identified, or the individuals involved need to be contacted. Those with ordinary skill in the art will recognize that this information may be tracked in the statistics area 70, by a separate database, by the web site software associated with the administrative homepage 98, the buyer homepages 106, or the supplier homepage 144, or may be tracked in any other suitable manner.

Figure 8:
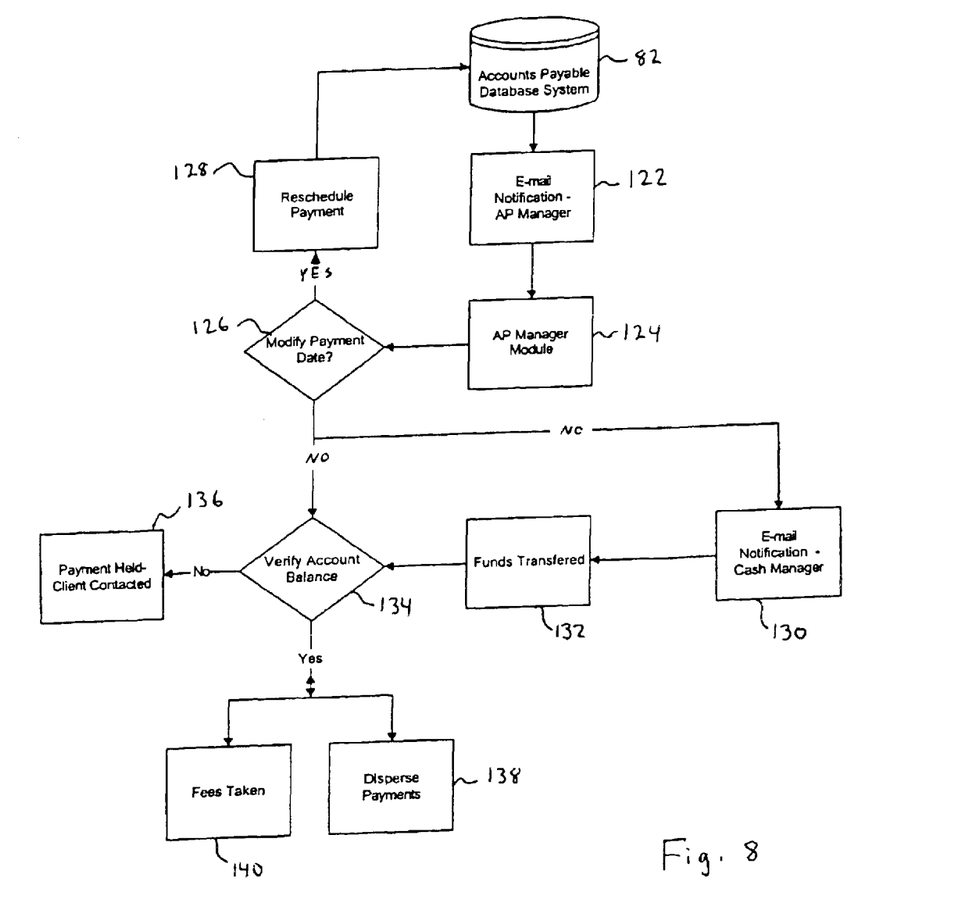
FIG. 8 is a flow diagram of the cash management process of the present invention.

FIG. 8 illustrates a preferred embodiment of the cash management process flow. At a predetermined time, for example, two days, prior to payment of an invoice, or part thereof, corresponding to a record in the accounts payable database system 82, an appropriate notification is provided to the client alerting the client that the payment is due. Such a notification may be via e-mail as in step 122, and may be to the accounts payable manager of the client. It will be recognized by one of skill in the art that other modes of notification may be utilized and notification may be to one other than the accounts payable manager. However, the purpose of the notification is to alert that a payment is due within the predetermined amount of time.

The accounts payable manager can then access the system, such as through the World Wide Web 100, and access the accounts payable manager module or homepage 124. Within the accounts payable manager module or homepage 124, the manager would be able to look at the individual records for which notification has been sent and decide whether the payment date in the records should be modified, as identified in step 126. If the payment date is to be modified, then the payment is rescheduled in step 128 and the item returned to the accounts payable database system 82.

If the payment date is not to be modified, then a notification is sent to the manager of the cash that will be made available for payment. This may take the form of an e-mail notification, as noted in step 130. The notification will request transfer of full funds necessary for the particular payment. The funds are then transferred in step 132 to an account from which the payment will be made. Then a check in step 134 will be made to verify that sufficient funds are available in the account to make the appropriate payments. If there are not appropriate funds in the account, then payment is not made and the client is contacted in step 136 to resolve the discrepancy. If there are sufficient funds, then payments are disbursed in step 138 and any appropriate fee is also withheld in step 140.

In an alternative embodiment, once the decision is made not to modify the payment date, then the client may provide for direct payment outside of the system of the present invention.

Alternatively, once the decision is made not to modify the payment date, the client may authorize withdrawal of funds from a pre-existing account under the client's control. It will be recognized by one with ordinary skill in the art that many arrangements may be made for the payment of the respective invoices without departing from the spirit or scope of the invention.

Figure 9:
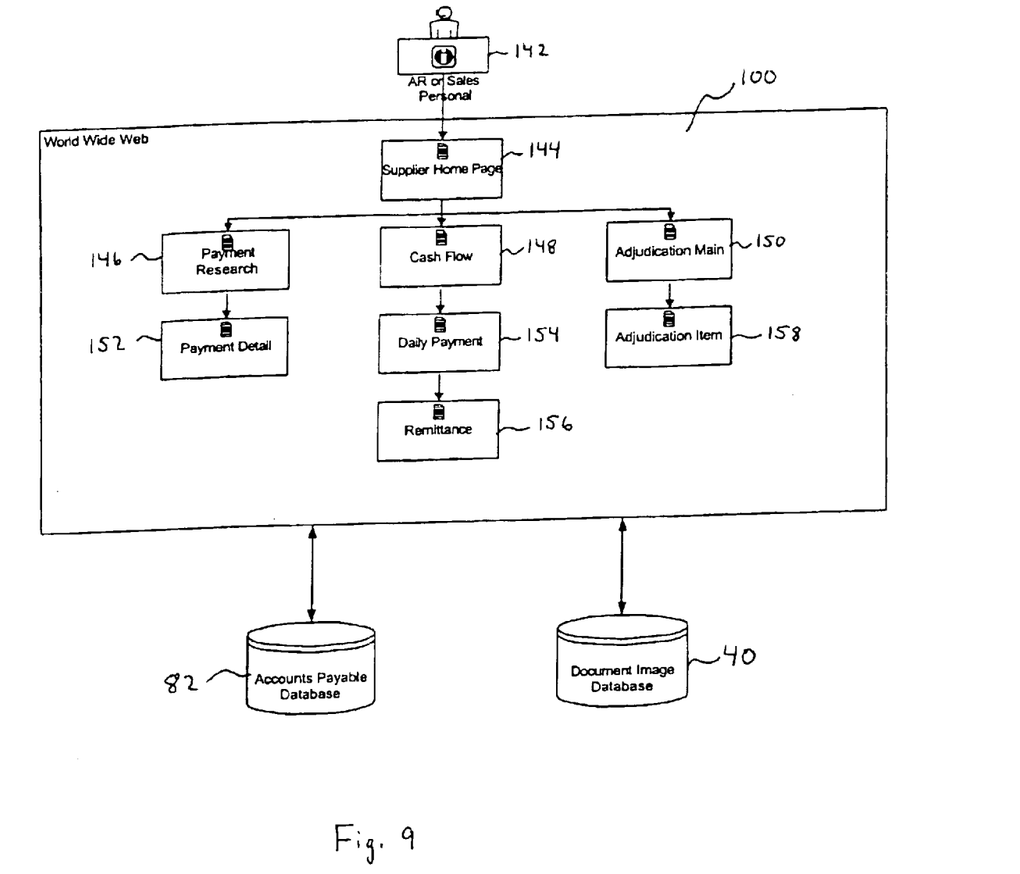
FIG. 9 is a schematic representation of the supplier access process of the present invention.

FIG. 9 illustrates a preferred embodiment of the supplier process flow in which the supplier has access to the system of the present invention. The accounts receivable or sales personnel 142 from the supplier will access the interactive platform through a supplier homepage 144. In a preferred embodiment, the access will be via the World Wide Web 100, but it will be recognized by one of ordinary skill in the art that any suitable network may be used for access, including LAN, WAN, or other networks. From the supplier homepage 144, the supplier personnel may access information regarding payment research 146, cash flow 148, or adjudication 150.

From the payment research access 146, the personnel 142 may enter a search term, such as a purchase order number or invoice number, to identify a record corresponding to the particular data input. From there they may see payment detail information, including whether payment has been authorized, when payment was sent, etc. This is illustrated on FIG. 9 by step 152.

From the cash flow access 148, the personnel 142 may see what daily payments 154 have been made or are to be made to the supplier and may see further remittance information 156 regarding the cash flow to the supplier.

From the adjudication access 150, the supplier personnel 142 may see all of the adjudication items 158 relating to that supplier, including the particular issue and the detailed information for both the purchase order side and the invoice side. The supplier personnel 142 will have the ability to resolve the issue, but the ability is limited to choosing only a lower quantity or a lower price for the item in adjudication. For example, if the reason for an item being in adjudication is because the line item unit price has a discrepancy of five cents per item, the supplier may elect to not hold up the payment merely because of such a minor discrepancy. A higher quantity or a higher price may not be chosen by the supplier at this point. If the item is adjudicated by the supplier through the adjudication access 150, then this is removed from the client resolution workflow illustrated in FIG. 7, and immediately sent to the payment queue 66 for payment.

From the supplier homepage 144, the information supplied comes from the accounts payable database 82 and/or the document image database 40. At any time, the supplier personnel 142 may review the image of the invoice or of any receiving documents that have been entered into the document image database 40. The supplier access and supplier homepage 144 may be of any format and is customizable to meet the needs of the supplier.

The method and system of the present invention also allows a variety of reports to be generated. Although specifically described only in relation to FIG. 5, the statistics area 70, which may be the same or separate database from that with the purchase order, invoice, and receipt information, is provided with data regarding all or selected portions of the steps conducted by the method and system of the present invention. This data may be used to charge fees to the buying companies and selling companies that utilize the interactive platform based on utilization of specific features. Further, the data relating to any step of the method may be used to generate reports for tracking, planning, etc., purposes.

The data regarding the various transactions and resolutions of the present invention are stored for report generation, historical, and audit purposes. These data may be obtained through the various databases, including but not limited to the accounts payable database 82, the statistics area 70, the balancing account 62, the audit file 118, the remittance file 120, and the workflow resolution tracking process. These databases and other areas of the interactive platform may be the same database, parts of the same database, interconnected databases, or independent, separate databases. Access to the data is controlled by means of selected authorization to the data. The data may be selectively made available for remote access by the buying company 11 or the selling company 13, preferably over the world wide web 100 via the administrative homepage 98, the buyer homepage 106, and/or the supplier homepage 144.

The present invention also supports elimination of the invoice process entirely. For example, if the selling company provides a supply pricing database to the interactive transaction platform, the interactive transaction platform could automatically provide for payment by the buying company for goods received by the buying company without generation of an invoice. Any discrepancies are resolved in accordance with the dispute resolution system described herein. The invoice data of FIG. 3 would be provided internally from the interactive transaction platform, and not directly provided by the selling company. Likewise, purchase order data and receipt data could be automated through the interactive transaction platform without the need to generate actual external purchase orders and receipt documents.

The system of the present invention is an interactive platform 15 that will automatically process transactions between at least one buying company 11 and at least one selling company 13. The system includes at least a data input center 10 for receiving purchase order data, invoice data, and receipt data; a database for storing at least the purchase order data, invoice data, and receipt data; an application platform for automatically comparing selected purchase order data or receipt data with corresponding selected invoice data as described above; and a communication interface with the buying company 11 and the selling company 13 for resolving discrepancies between the purchase order data, the invoice data, and the receipt data. It will be recognized by those with skill in the art that any computer system capable of performing the above and following functions is within the spirit of the present invention. The specific computer system and other hardware implemented will depend on the preference of the user.

The data input center 10 has at least an optical scanner for generating a scanned image of data that is received in paper format, such as paper purchase orders 12, paper invoices 14, and paper receiving data 16, illustrated on FIG. 3. The data input center 10 also includes facsimile machines, storage facilities, and electronic storage facilities sufficient to conduct the data input and storage functions illustrated on FIG. 3 and described above. The data input center 10 further includes a data translater for translating data between formats to ensure the data is in a format compatible with the system.

The system of the present invention also utilizes a computer system and a computer network through which buying companies 11 and selling companies 13 may access the system. Preferably, this computer network is a global computer network, and, most preferably, this global computer network is the internet. This system includes communication interfaces with the network such that buying companies 11 and selling companies 13 may access the interactive platform 15 contained with the system. Preferably, this access by buying companies 11 and selling companies 13 is via a web page. In order to maintain the security of the access to the database(s) within the interactive platform 15, access, whether or not via a web page, is provided only via selected authorization.

The system of the present invention includes one or more databases for storing of the information processed by the above-described method. It will be recognized by those with skill in the art that there may be a single database, having many different partitions or sections, or several different databases, with selected connectivities between the databases. Whether the steps of the method described above are completed using a single database with multiple partitions or sections or several databases does not depart from the spirit of the invention.

The exact configuration of the computer system, database (s), and any other hardware necessary to carry out the method of the present invention is not critical to the invention, except as described in the appended claims. Thus, any conventional computer system, communication interfaces, databases, memory, connectivities, etc. may be utilized without departing from the spirit of the invention.

It will therefore be readily understood by those persons skilled in the art that the present invention is susceptible of broad utility and application. Many embodiments and adaptations of the present invention other than those herein described, as well as many variations, modifications, and equivalent arrangements, would be apparent from or reasonably suggested by the present invention in the foregoing description thereof, without departing from the substance or the scope of present invention. Accordingly, while the present invention has been described herein in detail in relation to a preferred embodiment, it is to be understood that this disclosure is only illustrative and exemplary of the present invention and is made merely for the purposes of providing a full and enabling disclosure of the invention. The foregoing disclosure is not intended or to be construed to limit the present invention or otherwise to exclude any such other embodiments, adaptations, variations, modifications, or equivalent arrangements, the present invention being limited only by the claims appended hereto and the equivalents thereof.

We claim:

1. A method for automatically processing transactions between a buying company and a selling company, comprising the steps of:

(a) obtaining via a computer network purchase order data having at least one entry, the purchase order data including purchase order header information and purchase order detail information having line items;

(b) obtaining via a computer network invoice data having at least one entry, the invoice data including invoice header information and invoice detail information having line items;

(c) automatically comparing selected purchase order header information and corresponding selected invoice header information to identify a matched record having purchase order data and corresponding invoice data;

(d) automatically comparing via a computer the total cost of goods received from the matched record purchase order data and total cost of goods shipped from the matched record invoice data according to a predetermined tolerance;

(e) if the total costs are within the predetermined tolerance, then automatically providing for payment of invoices corresponding to the matched record invoice data;

(f) if the total costs are not within the predetermined tolerance, then electronically comparing selected purchase order line items and selected invoice line items according to predetermined rules;

(g) if the selected line item comparison satisfies the predetermined rules, then providing for payment of the line item(s) corresponding to the selected invoice line item(s); and (h) if the selected line item comparison does not satisfy the predetermined rules,
  (i) automatically notifying the buying company for resolution of any purchase order line item(s) not matching invoice data; or
  (ii) automatically notifying the selling company for resolution of any invoice line item(s) not matching purchase order data.

2. The method of claim 1, wherein the computer network used to obtain purchase order data is a local area network.

3. The method of claim 1, wherein the computer network used to obtain purchase order data is a wide area network.

4. The method of claim 3, wherein the wide area network is the Internet.

5. The method of claim 1, wherein the computer network used to obtain invoice data is a local area network.

6. The method of claim 1, wherein the computer network used to obtain invoice data is a wide area network.

7. The method of claim 6, wherein the wide area network is the Internet.

8. The method of claim 1, wherein the purchase order data is stored in a database.

9. The method of claim 8, wherein the database is a central database.

10. The method of claim 1, wherein the invoice data is stored in a database.

11. The method of claim 10, wherein the database is a central database.

12. The method of claim 1, wherein the purchase order data and the invoice data are stored in a database.

13. The method of claim 12, further comprising the step of providing for interaction with the database by at least one of the buying company or selling company.

14. The method of claim 13, wherein the step of providing for interaction with the database is performed using a network interface.

15. The method of claim 14, wherein the network interface comprises a web page.

16. The method of claim 1, wherein the purchase order header information comprises a purchase order number, a client identifier, a vendor identifier, and a purchase order date.

17. The method of claim 16, wherein the purchase order detail information comprises the purchase order header information and purchase order entries comprising a quantity ordered, an item identifier, a unit price, and a charge code.

18. The method of claim 1, wherein the invoice header information comprises an invoice number, a client identifier, a vendor identifier, and an invoice date.

19. The method of claim 18, wherein the invoice detail information comprises the invoice header information and at least one invoice entry comprising a quantity shipped, an item identifier, and an extended price.

20. The method of claim 1, wherein the step of automatically comparing selected purchase order data and corresponding selected invoice data is computer-implemented.

21. The method of claim 1, further comprising the step of facilitating the financing of accounts based upon the matched records.

22. The method of claim 21, wherein the facilitating step is the factoring of accounts receivable.

23. The method of claim 1, wherein predetermined tolerance is expressed as one of the following: a percentage of the total cost, a percentage of an absolute dollar figure, or a combination of both.

24. The method of claim 1, wherein the predetermined rule comprises paying the lower of invoice cost and purchase order cost.

25. The method of claim 1, wherein the predetermined rule comprises paying the lower of invoice quantity and purchase order quantity.

26. The method of claim 1, wherein the predetermined rule comprises a dollar or percent tolerance amount to approve payment of the invoice or chargeback the difference.

27. The method of claim 1, wherein the predetermined rule comprises of making payment decisions at the invoice and purchase order line level, by comparing item, quantity, unit cost and extended costs of all lines and making payment decisions at the line level.

28. The method of claim 1, wherein the purchase order data includes the items and quantities of goods received.

29. The method of claim 1, wherein the predetermined tolerance is from a tolerance consideration table, wherein data in tolerance consideration table is predetermined data for a plurality of clients wherein at least one entry from one client is different from at least one other client.

* * * * *